United States Patent [19]

McElroy et al.

[11] Patent Number: 5,228,729
[45] Date of Patent: Jul. 20, 1993

[54] TUBE TAB LOCKING AND COUPLING CONNECTOR

[75] Inventors: Donald J. McElroy, Fenton, Mich.; Harry W. Zarvos, Scottsdale, Ariz.

[73] Assignee: Ford Motor Company, Dearborn, Mich.

[21] Appl. No.: 815,179

[22] Filed: Dec. 31, 1991

[51] Int. Cl.⁵ .......................................... F16L 39/00
[52] U.S. Cl. .................................... 285/319; 285/921
[58] Field of Search ............... 285/319, 321, 921, 318

[56] References Cited

U.S. PATENT DOCUMENTS

| | | | |
|---|---|---|---|
| 2,468,847 | 5/1949 | Trainor | 285/174 |
| 2,468,848 | 5/1949 | Trainor | 285/174 |
| 2,514,504 | 7/1950 | Moline | 248/56 |
| 2,550,591 | 4/1951 | Parsons | 285/319 |
| 2,556,659 | 6/1951 | Patterson | 285/91 |
| 2,906,549 | 9/1959 | Summers | 285/140 |
| 3,159,395 | 12/1964 | Mussett et al. | |
| 3,262,188 | 7/1966 | Briegel et al. | 29/157 |
| 3,588,149 | 6/1971 | Demler et al. | 285/110 |
| 3,603,621 | 9/1971 | Parsons | 285/319 |
| 3,929,357 | 12/1975 | DeVincent et al. | 285/319 |
| 3,933,378 | 1/1976 | Sandford et al. | 285/319 |
| 4,035,005 | 7/1977 | DeVincent et al. | 285/319 |
| 4,055,359 | 10/1977 | McWethy | 285/39 |
| 4,401,326 | 8/1983 | Blair | 285/318 |
| 4,487,437 | 12/1984 | Dickirson | 285/319 |
| 4,637,640 | 1/1987 | Fournier et al. | 285/319 |
| 4,681,351 | 7/1987 | Bartholomew | 285/319 |
| 4,778,203 | 10/1988 | Bartholomew | 285/111 |
| 4,783,101 | 11/1988 | Peterson et al. | 285/319 |
| 4,793,637 | 12/1988 | Liapply et al. | 285/39 |
| 4,802,697 | 2/1989 | Bartholomew | 285/319 |
| 4,875,709 | 10/1989 | Caroll et al. | 285/14 |
| 4,913,467 | 4/1990 | Washizu | 285/39 |
| 4,964,658 | 10/1990 | Usui et al. | 285/319 |
| 5,039,139 | 8/1991 | McElroy et al. | 285/319 |

FOREIGN PATENT DOCUMENTS

| | | | |
|---|---|---|---|
| 683011 | 3/1964 | Canada | 285/318 |
| 3705236 | 9/1988 | Fed. Rep. of Germany | 285/319 |
| 4-8991 | 1/1992 | Japan | 285/319 |
| 350822 | 11/1972 | Switzerland | 285/319 |

Primary Examiner—Eric K. Nicholson
Attorney, Agent, or Firm—Roger L. May; Raymond L. Coppiellie

[57] ABSTRACT

A quick connect coupling for joining a pair of fluid-carrying, mutually sealed, tubes. One tube includes a cup-shaped cage secured to one end thereof of the tube next to the mount. The cage has a radial base portion with a circular aperture through which the first tube end portion projects and a wall portion extending generally perpendicularly from and connected to the base portion. The cage further includes a plurality of equally radially spaced locking tabs secured to the wall portion and extending at a angle from the wall portion toward the aperture in the base. The second tube is telescopically mountable on the first tube and has a return bend on the lead end. When the two tubes are connected, the return bend engages and cams under the locking tabs and is thereby held by the locking tabs to prevent disconnection of the first and second tube ends.

11 Claims, 3 Drawing Sheets

TUBE TAB LOCKING AND COUPLING CONNECTOR

TECHNICAL FIELD

This invention relates to a coupling for joining tubes that carry fluid and, more particularly, to quick connect couplings.

BACKGROUND

Tube couplings are used to join tube ends to form a continuous fluid passageway. Often this joining is done in connection with a production operation. The time it takes to perform the coupling is important as is the integrity of the connection.

In commercial production today is a quick connect coupling as shown in U.S. Pat. No. 4,055,359 assigned to the assignee of the present invention, the contents of which are hereby incorporated by reference. It provides a simple, relatively inexpensive, and totally reliable coupling for an air conditioning line. It includes an expandable circular spring loosely and substantially coaxially held within an annular cage mounted on a first tube, and a second tube to be telescopically mounted on the first tube and including a flared end which cams under the inside diameter of the spring as the second tube is being inserted upon the first tube. As the second tube is brought home in the coupling, the flared end passes the spring allowing the spring to contract radially onto the tube within the cage.

A special tool is needed to disassemble the coupling for service-related reasons. The special tool slips over the second tube and includes an inclined lip which is directed toward the spring expanding it to an inside diameter greater than the flared end of the second tube, at which point the second tube may be retracted. Over a long period of service, or particularly extreme operating conditions, the internal cavity of the cage can become impacted with foreign material thus making it difficult to disassemble the coupling.

There is also known a quick connect coupling as shown in U.S. Pat. No. 5,039,139, assigned to the assignee of the present invention, which avoids any disassembly difficulties which might be caused by impacted foreign material within the case. It also includes a cage structure which provides a clear view of the assembled coupling at a point where the locking means on the cage of the first tube engages the back side of the flared end of the second tube. It is constructed of a substantially single spring steel clip, with the spring steel locking tabs being formed by a separate staking operation performed on the spring steel cage. The coupling is disassembled by means of the same tool as afore described in connection with U.S. Pat. No. 4,055,359.

The present invention offers the more important advantages of the couplings shown in the aforementioned U.S. Patents. The cage member can be formed on a relatively low tonnage press as in the case with U.S. Pat. No. 4,055,359. Also, the cage includes a plurality of individual locking tabs radially spaced about the cage which function in a manner very similar to the individual locking tabs as shown in U.S. Pat. No. 5,039,139.

SUMMARY OF THE INVENTION

The present invention contemplates providing a coupling which can be easily disconnected for servicing and performing maintenance.

The invention also contemplates providing a coupling which is inexpensive to manufacture vis-a-vis conventional couplings.

The present invention contemplates a coupling for joining first and second tubes, the first tube includes (i) an end portion having a terminal end and a mounting means a predetermined distance from said terminal end and (ii) a cage secured externally of the end portion on said mounting means in axially inwardly spaced relation to said terminal end. The cage comprises a radial base portion having a circular aperture through which the first tube end portion projects, and a wall portion extending generally perpendicularly and connected to the base portion, the cage further includes at least one locking tab, and preferably a plurality of equally radially spaced locking tabs, secured to the wall portion and extending at an inclination from the wall portion toward the aperture in the base. The second tube includes an end portion having a terminal end telescopically mountable on the first tube end portion, and a return bend on the terminal end. The return bend engages and cams under the locking tab or tabs when the second tube is telescopically mounted on the first tube, and is then held by the locking tab or tabs to prevent disconnection of the first and second tube ends.

In a first set of embodiments, the individual locking tabs which are radially spaced about the generally cup-shaped cage are loosely held in place on the cage by means of their own structure and without any assistance from an auxiliary retention means.

In a second set of embodiments, the plurality of locking tabs are, at least in part, held onto the cage member by separate respective retainer clips. The retainer clips can be formed from the cage member itself, as by staking the retainer clip from the body of the cage and then tempering it to give it springlike characteristics. In the alternative, the retaining means can be a plurality of respective individual spring clips to be affixed onto the cage member in much the same manner as the locking tabs themselves.

The invention also contemplates a method of positively connecting the tube ends which comprises the steps of affixing to said first tube a locking means having a spring tab projecting radially inwardly in a direction axially away from an end on a first tube and forming a return bend on the end of the second tube and slip fitting the return bend over the first tube causing it to cam past the locking tab thereby precluding the withdrawal of the second tube relative to the first tube.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
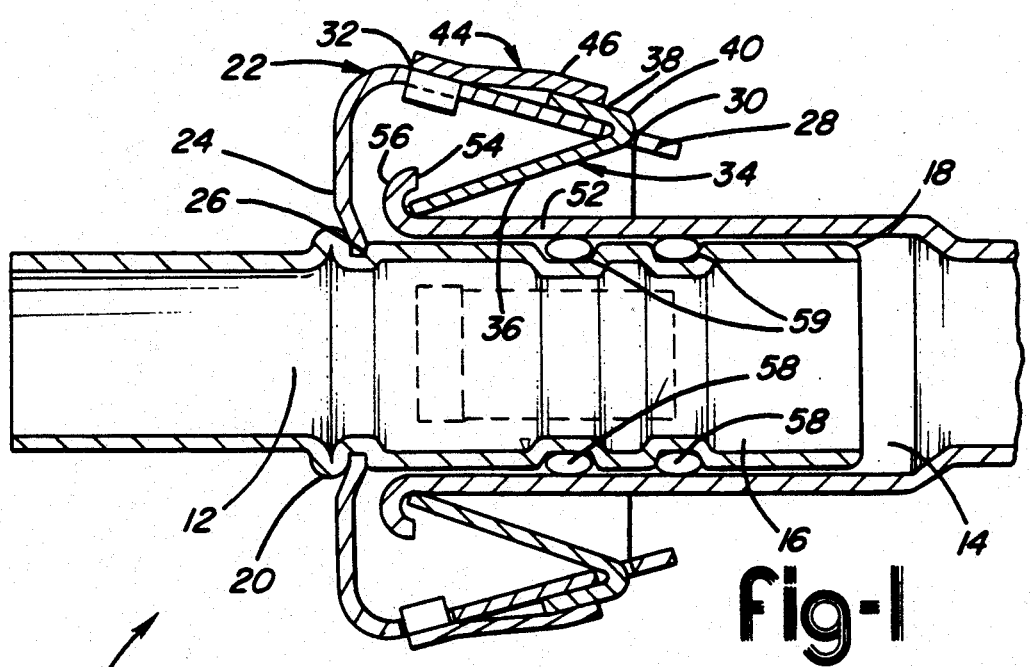
FIG. 1 is a sectional assembly view of a quick-connect tubular coupling embodying the present invention.
Figure 2:
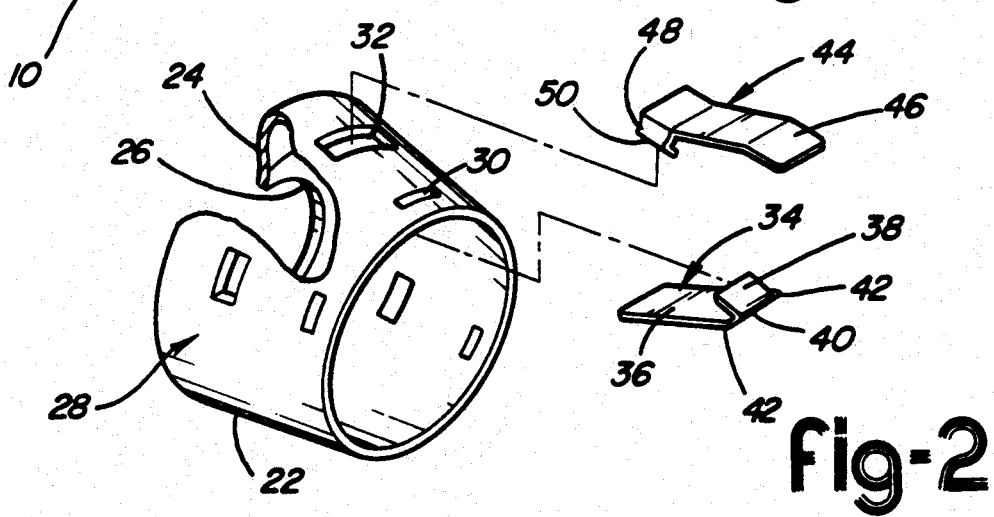
FIG. 2 is an exploded partial assembly view of the coupling shown in FIG. 1.

With reference to FIGS. 1 and 2, a tube coupling constructed in accordance with a first embodiment of the present invention is generally indicated by reference numeral 10 and is used for coupling together a first tube 12 and a second tube 14. First tube 12 includes an end portion 16 having a terminal end 18. First tube 12 also includes a mounting means or mount 20 in the form of an annular upset flange a predetermined distance from the terminal end 18. A cage 22 is mounted externally of the end portion 16 by mount 20 to prevent axial displacement of the cage relative to the first tube 12. Cage 22 includes a radial base portion 24 having a circular aperture 26 through which first tube end portion 16 projects. A cylindrical wall member 28 extends generally perpendicularly to the base portion 24, or at a slight angle thereto such that the open end converges radially toward the second tube 14. Thus, the cage is generally cup-shaped and symmetrical in design thereby allowing it to be formed by a relatively simple sheet metal forming operation.

Any of the components, including the first and second tubes 12,14 and the cage 22 can be made of materials other than metal, for example each may be made of a plastic material. Further, if injection molded, or made by a similar process, the first tube 12 and cage 22 could be an integral one-piece molding.

At equally radially spaced positions about the circumference of the cage, there is provided a pair of openings 30 and 32. Each of the pairs are in axial alignment with one another.

Within the first or forwardmost opening 30 there is located a locking tab 34. The locking tab is generally V-shaped whereby the respective legs 36,38 converge at an apex or juncture 40. The one leg 36 provides a locking portion which, when assembled as shown in FIG. 1, is projected radially inward at an acute angle relative to the longitudinal axis of the coupling. The other leg 3 of the locking tab 34 is adapted to be inserted within the opening from the interior of the cage and thereafter to lie flat against the outer wall surface of the wall 28. It will be noted from FIG. 2 that the leg or tongue 38 is of less width than the locking portion 36 and thereby provides a pair of abutment shoulders 42 on either side of the tongue 38. The tongue is of a width substantially equal but slightly less than the width of the opening 30 whereby the tongue may pass through the opening but the abutment shoulders will engage the inner surface of the wall thereby providing a pivot point or fulcrum for the locking tab when the second tube 14 is being assembled within the coupling.

The coupling further includes a retainer clip 44 which has a tongue portion 46 at its free end and a retainer clip portion 48 formed at its other end. The retainer clip portion includes a pair of generally downward projecting legs, with the legs being bent at the midpoint to form an elbow having a crease line, indicated at 50. The distance between the respective crease lines slightly exceeds the width of the opening 32, such that when the retainer clip is pressed into the cage the elbow will pass to the inner surface of the wall member and spread circumferentially beyond the width of the opening 32, thereby retaining the clip onto the cage. The tongue 46 of the retainer clip will be seen to overlap the tongue 38 of the locking tab 34, thereby assuring that the locking tab will be held secured onto the cage member at all times.

The second tube 14 has an end portion 52 including a terminal end 54. Terminal end 54 includes a flared end or return bend 56. Second tube 14 is telescopically mounted over the end portion 16 of the first tube 12. As the second tube 14 is slid over the end portion of the first tube 16, during the coupling of the first and second tubes 14, the return bend 56 is captured by the leg or locking portion 36 of the locking tab 34 to prevent disconnection of the first and second tube end portions 16,52. Thus, a continuous fluid passageway is formed between the two tubes. O-ring seals 58 are located within respective grooves in the end portion 16 of the first tube. These are depressed as the second tube is slid onto the first tube, and provide a seal between the two tubes thereby precluding any leaking of fluid beyond the coupling.

Figure 3:
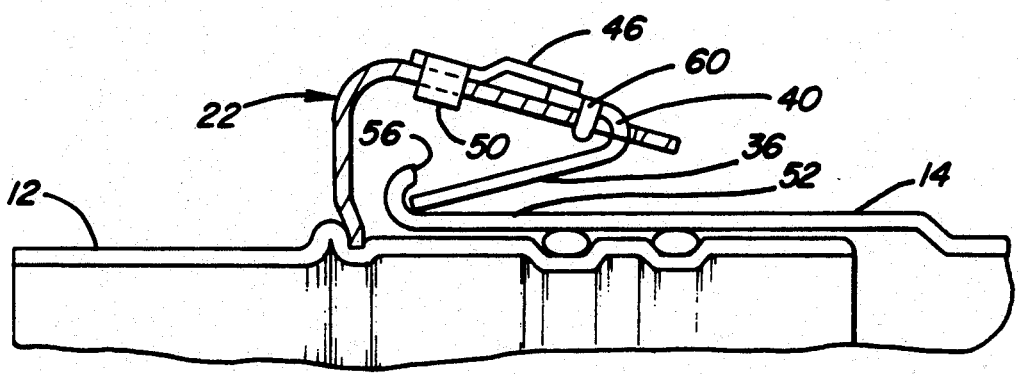
FIG. 3 is a view in part similar to FIG. 1 showing a second coupling embodiment.
Figure 4:
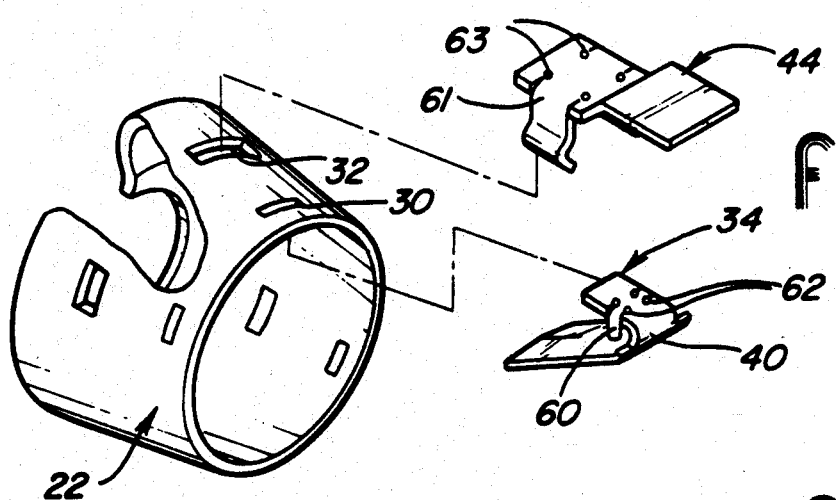
FIG. 4 is a view similar to FIG. 2 showing an exploded partial assembly of the second embodiment.

A second embodiment of the present invention as shown in FIGS. 3 and 4 is quite similar to that previously described. Where the elements of the coupling are identical, like reference numerals are used. The embodiment is distinguished from the first by the specific structure of the locking tab 34 and that of the retainer clip 44. The locking tab 34 includes a pair of downward depending legs 60, one on each side of the tongue 38. Each is located a distance from the apex 40 slightly less than the depth of the retention opening 30. Thus, when installed, the leg and apex help restrain any tendency of the clip to move axially within the opening 30. Likewise, the structure permits use of an opening 30 of greater axial length than that shown in FIGS. 1 and 2. This can be of some assistance in easing the assembly of the locking tabs into the cage structure.

Further, it is to be noted that the legs 60 of the locking tab are cut from the edge portions of the tongue along saw lines beginning at respective stress relief holes 62. This adds some resiliency to the legs which can assist in assembling the locking tab onto the cage.

Likewise, the retainer clip 44 shown in the second embodiment of FIG. 4 includes similar resilient legs 61 which are cut from the body portion of the retainer clip beginning at the stress relief holes 63.

Figure 5:
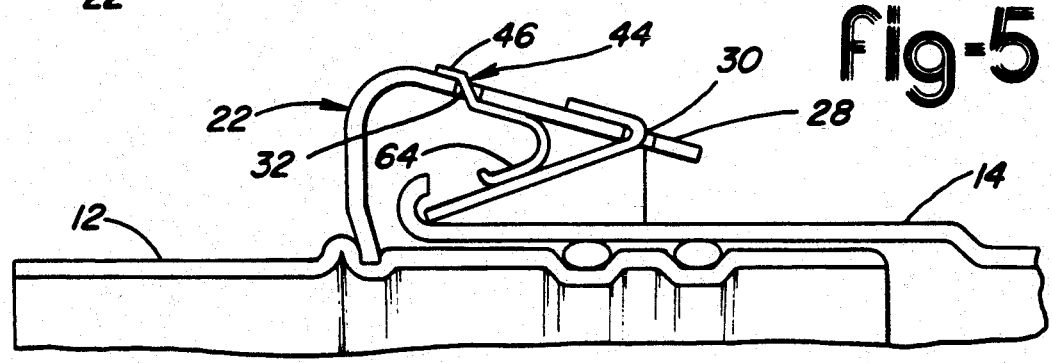
FIG. 5 is a view similar to FIGS. 1 and 3 and showing a third embodiment.
Figure 6:
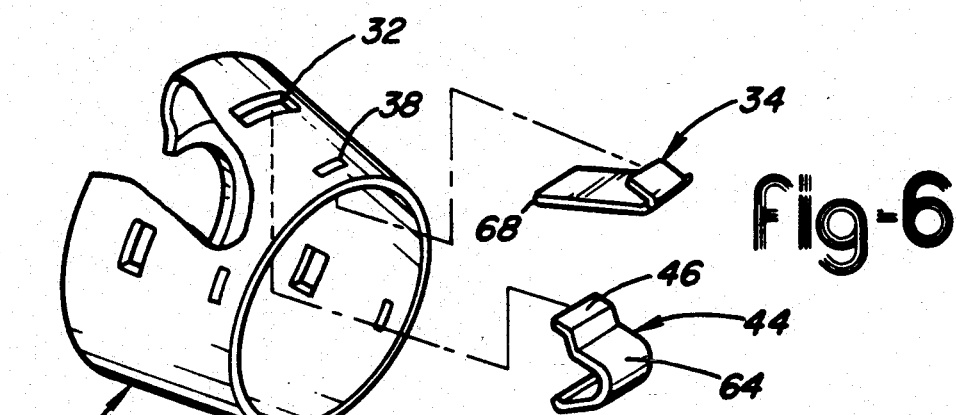
FIG. 6 is a view similar to FIGS. 3 and 4 and showing a third embodiment.

A third embodiment of the present invention as shown in FIGS. 5 and 6 is identical to the first embodiment of FIGS. 1 and 2, with the exception of the retaining clip 44. As seen in FIG. 6, the retaining clip 44 is to be mounted onto the cage 22 from the interior thereof by sliding the tongue 46 through the opening 32. The generally U-shaped spring portion 64 of the clip is held between the locking portion 36 of the locking tab and the inner wall surface of the wall 28. It assures that the locking portion will be biased radially inward toward the longitudinal axis of the tubes 12,14 as the coupling is being assembled. As the return bend 56 passes over the leading end 68 of the locking tab 34, the spring member will be compressed. Upon the return bend passing the lead end 68, the lead end will be radially biased inward of the return bend thereby holding the tube ends axially affixed relative to one another.

Figure 7:
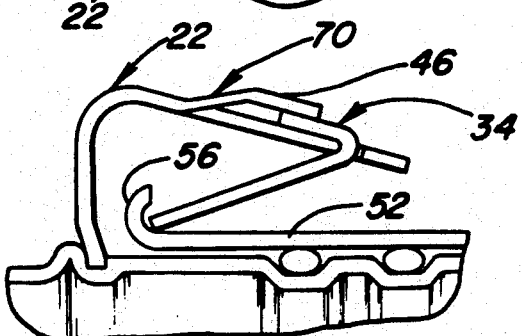
FIG. 7 is a view similar to FIGS. 1, 3 and 5 showing a fourth embodiment.
Figure 8:
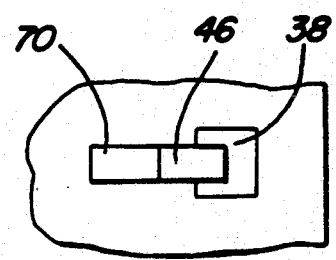
FIG. 8 is a partial plan view of the coupling assembly shown in FIG. 7.

A fourth embodiment of the present invention is shown in FIGS. 7 and 8 whereby the coupling structure is identical to that described above in FIGS. 1 and 2, with the exception that the retaining clip is integrally formed with the cage 22. The integral retainer clip 70 includes a raised tongue 46 which overlaps the tongue 38 of the locking tab 34 and holds it onto the cage. In manufacturing this cage, it is a common forming operation to stake the retainer clip portion and to form it to the shape shown in FIG. 7 during a staking operation. The locking tab opening 30 may be pierced at the same time. Following the forming operation it is preferable to heat-treat or temper the retainer clip portion so that it retains its spring qualities throughout the life of the coupling assembly.

Figure 9:
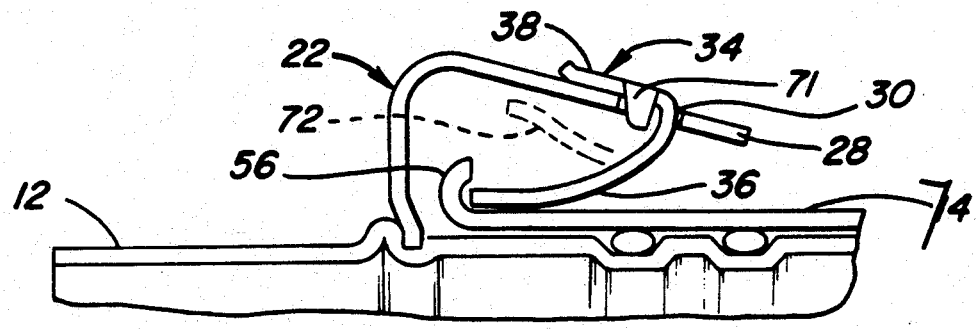
FIG. 9 is a view similar to FIGS. 1, 3, 5 and 7 showing a fifth embodiment of the present invention.
Figure 10:
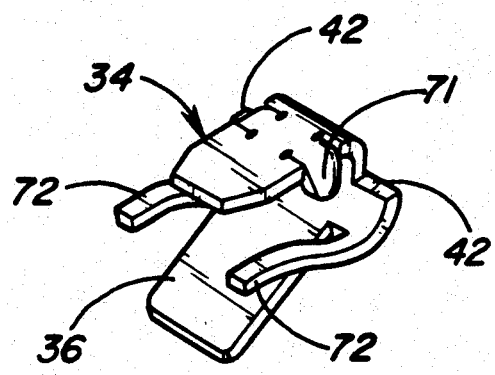
FIG. 10 is a perspective view showing the locking tab member illustrated in FIG. 9 and forming a part of the present invention.
Figure 11:
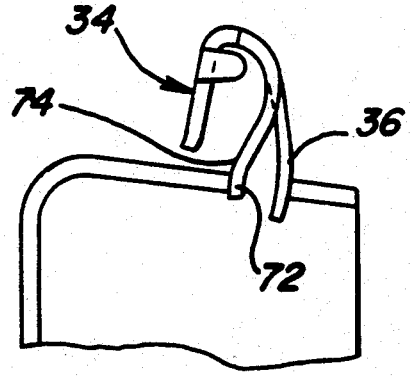
FIG. 11 is a partial assembly view of the coupling shown in FIG. 9 and illustrating the manner in which the locking tab member of FIG. 10 is to be assembled within the cage member of the present invention.

In FIGS. 9-11, there is shown a fifth embodiment of the present invention wherein the locking tab 34 includes as part of its integral structure the means for retaining the locking tab in at least semi-fixed position upon the cage member. In all other respects the coupling structure is the same as that previously described, particularly with reference to FIGS. 1 and 2.

In FIGS. 9 and 10, it will be noted that the locking tab includes a locking tab portion 36 and a tongue 38. The tongue includes a pair of legs 71 depending down toward the locking tab portion and adapted to assist in retaining the axial position of the locking tab within the opening 30 of the cage, all as previously described in connection with the retainer clip shown in FIGS. 3 and 4. The tongue is of a width slightly less than the opening and the locking tab portion is of the same width. On opposite sides of the locking tab, there is provided a pair of underside retention legs 72 projecting from the sides of the locking portion 36 and thereby providing a pair of abutment shoulders 42 as previously described. The retention legs 72 may be given a slight arc shape as shown with a reverse bend 74. The reverse bend helps in collapsing the lead ends of the locking tab as it is to be radially inserted through the opening 30 from the outside of the cage 22 as shown in FIG. 11. Upon inserting it into the opening, the locking tab is turned such that the underside retention legs 72 engage or nearly engage the undersurface of the wall 28.

All of the foregoing embodiments generally operate in the same manner as previously described in connection with the description of the coupling assembly of FIGS. 1 and 2.

The method for connecting the first and second tubes 12, 14 begins by forming a mount 20 a predetermined distance from the end 18 of the first tube 12. Thereafter, the cage 22 as provided with locking tab members 34 is mounted on the end portion 16 of the first tube 12 at the mount 20 so that the locking portions 36 are directed in a direction away from end 18. The return bend 56 is formed on the second tube 14 and the second tube is slip-fit in a telescoping relationship over the end 18 of the first tube 12 throughout the end portion 16. As the return bend 56 passes the locking tabs 34, the locking tabs cam outwardly, thereby allowing the return bend 56 to pass the locking portions 36. After the return bend 56 passes the locking portions 36, the locking portions return to their original inclination to capture the return bend between the base 24 and the locking tabs.

The disassembly of the coupling 10 is accomplished with the aid of a tool (not shown) that may be slipped over the second tube and pressed axially inward toward the locking tabs in a manner that will cam the locking tabs 34 outwardly as the tool is slid along the second tube toward the first tube. This allows the return bend to be radially clear of the locking tabs at which point the two tabs can be separated. The tool, and a more detailed description of its structure and use, is set forth in U.S. Pat. No. 4,055,359.

While the best mode for carrying out the invention have been described in detail, those familiar with the art to which this invention relates will recognize various, alternative designs and embodiments for practicing the invention. Thus, the above described preferred embodiment is intended to be illustrative of the invention which may be modified within the scope of the following appended claims.

We claim:

1. A coupling for joining first and second tubes comprising:
   a first tube;
   said first tube including an end portion having a terminal end; and
   a mounting means a predetermined distance from said terminal end;
   a cage mounted externally of the end portion on said mounting means in axially inwardly spaced relation to said terminal end, said cage including a radial base portion having a circular aperture through which said first tube end portion projects;
   said cage further including a wall member extending generally perpendicularly and connected to said base portion, said wall member including a plurality of substantially equally radially spaced locking tab openings at the end of said wall member furthest from said radial base portion;
   a plurality of locking tabs;
   one each of said locking tabs being located and secured within each said locking tab opening;
   each said locking tab extending at an inclination from said wall member axially and radially toward said aperture in said base;
   a second tube;
   said second tube including an end portion having a terminal end telescopically mountable on said first tube end portion;
   a return bend on said telescopically mountable terminal end for capturing said locking tabs of said cage when said second tube is telescopically mounted on said first tube to prevent disconnection of the first and second tube ends; and
   each said locking tab being generally V-shaped in a plane co-extensive with the longitudinal axis of the coupling, with one leg thereof being a locking portion extending radially and axially toward said opening, and with the other leg being a tongue, said tongue being received within a respective said locking tab opening, and each said locking tab further including an abutment means for engaging said wall member and thereby providing a fulcrum about which said locking tab will pivot as the return bend of said second tube engages, depresses and cams past the radially and axially innermost end of each said locking tab.

2. The coupling as in claim 1 wherein each tongue of a respective one of said locking tabs is of less width than said locking portion, thereby providing an abutment shoulder constituting said abutment means at the juncture of said legs and on each side of said tongue.

3. A coupling as in claim 2 wherein said cage is of a one-piece cylindrical cup-shaped member.

4. A coupling as in claim 3 wherein said cage is of a spring steel material.

5. A coupling as in claim 2 wherein said cylindrical wall further includes a retainer means for engaging and maintaining the tongue of each said locking tab in engagement with the radially outer surface of said wall member.

6. A coupling as in claim 5 wherein said retainer means includes a plurality of retainer clips;

said wall member including a plurality of retainer clip openings, each said retainer clip opening being in axial alignment with a respective locking tab opening;

each said retainer clip including a means for locking and retaining said retainer clip within said retainer clip opening and means for spring biasing a respective locking tab radially inwardly.

7. A coupling as in claim 5 wherein said retainer means is stamped radially outwardly from said wall to provide a tongue portion having a free end extending toward and radially overlaying said locking tab tongue.

8. A coupling as in claim 7 wherein said retainer tongue portion is tempered.

9. A coupling as in claim 1 wherein each said locking tab further includes axial abutment means for maintaining the axial location of the locking tab fixed within the respective locking tab opening.

10. A coupling as in claim 9 wherein said locking tab axial abutment means includes a pair of radially depending legs extending from said tongue and through the respective locking tab opening, said radially depending legs being axially located a distance from the juncture of said tongue and locking portion approximating the axial extent of each tab opening.

11. A coupling as in claim 10 wherein said locking portion of said locking tab further includes an underside retention portion;

said retention portion being directed radially toward said wall member and engaging the radially inner surface of said wall member and cooperating with said tongue to hold said locking tab securely against said wall member.

* * * * *